2,927,942

STABILIZATION OF ACRYLAMIDE

Norbert M. Bikales, Stamford, and Robert J. Munch, Greenwich, Conn., assignors to American Cyanamid Company, New York, N.Y., a corporation of Maine No Drawing. Application May 21, 1956
Serial No. 585,936

2 Claims. (Cl. 260—561)

This invention relates to unsaturated organic amides. More particularly, it relates to acrylamide and its α-substituted homologs and particularly to the stabilization of solutions of such amides against polymerization.

Acrylamide and its α-substituted homologs and the polymerization and copolymerization products thereof are employed in various fields. Especially are they of importance in such fields as adhesives, dispersants, plasticizers, surface coatings, thickening agents as well as in the leather, paper, textile, and photographic arts. Because of these many potential applications, methods of preparing the monomers are of particular interest.

These monomers are usually prepared by reacting the corresponding acrylonitrile with water and concentrated sulfuric acid. The reaction mixture comprising the amide sulfate is then further treated to separate the free amide. This may be conducted in various ways, one of which comprises treating an aqueous solution of the amide sulfate with an alkaline earth metal hydroxide or carbonate to precipitate an insoluble sulfate. Another procedure comprises treating a solution of the amide sulfate in an organic solvent with ammonia or an alkaline metal hydroxide or carbonate to form the corresponding sulfate which is insoluble in the solvent. An unusually successful procedure particularly adapted for the neutralization of acrylamide sulfate comprises treating an aqueous solution thereof with ammonia under controlled conditions of temperature and hydrogen ion concentration. Under these controlled conditions, the normally water-soluble ammonium sulfate precipitates and may be separated.

In each of these modes of neutralization, the residual liquor is usually treated to recover a crystalline product. Regardless of how the neutralization and crystallization are conducted, elevated temperatures are generally employed at some point in the process which aggravate the problem of premature polymerization existing because the amide is in solution. This problem is still further aggravated in continuous neutralization systems because of the extended residence time within the system of part of the original liquor due to the recycling of amide-bearing streams.

Although the present invention is particularly concerned with the problem of polymerization during the preparation of acrylamide and its homologs, the problem also exists on other situations. Thus, polymerization is also a serious problem in those instances in which it may be desired to store a solution of an amide. Similarly, the problem exists when the amide is employed as an intermediate under conditions favorable for polymerization. It is apparent, therefore, that there are various situations in which stabilization of an amide solution is highly desirable.

It would appear that this problem of premature polymerization could be readily overcome by incorporating in the amide-bearing solution any of known materials which have been suggested as polymerization inhibitors. Many of these materials, however, have been found unsatisfactory for one or more of various reasons. Some satisfactorily inhibit polymerization but discolor the solution and/or are difficult to remove prior to use of the solution for polymerization. Still others have been found to be ineffective as polymerization inhibitors for any extended period of time.

In accordance with the present invention, it has now been found that the polymerization of solutions of acrylamide and its α-substituted homologs can be effectively inhibited for extended periods of time by incorporating therein a material represented by the formula:

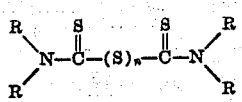

in which R is an alkyl radical of 1 to 4 carbon atoms and n is 1 or 2.

The inhibitors of this invention are readily prepared by reacting the appropriate secondary amine with carbon bisulfide. The resultant dithiocarbamate may then be converted into the corresponding mono- or disulfide. The compounds forming the present class of polymerization inhibitors are known and several have had fairly extensive use as ultra accelerators in the vulcanization of rubber for a number of years. The surprising effectiveness of these compounds as polymerization inhibitors for acrylamide and its α-substituted homologs, therefore, is quite unexpected.

The amount of inhibitor employed may vary over a wide range. It has been observed that stabilization is considerably enhanced by employing as little as 10 parts of inhibitor per million parts of amide solution. Usually, however, the amount employed will be greater than this and it may even range to as high as 2,000 p.p.m. Beyond this concentration, however, there is little if any additional stabilization advantage gained. It is a preferred practice in accordance with this invention to employ the inhibitor within a range of about 100–1000 p.p.m.

Aside from exhibiting an unusually effective stabilizing property, inhibitors of this invention have the further advantage in that they do not discolor the amide product and may be easily separated when desired. The inhibitor may be readily removed from the amide product by solvent extraction.

The invention is further illustrated by the following examples. Unless otherwise noted all parts are by weight.

EXAMPLE 1

Recrystallized acrylamide is dissolved in distilled water to give a 60% solution of acrylamide. Tetramethylthiuram monosulfide is then added to samples of this solution in the amounts shown in Table I, one sample being used as a blank. The samples are then observed for evidence of polymerization while being maintained at 50° C., and a pressure of 50 mm. Hg with oxygen-free nitrogen bubbling through to exclude oxygen. Results appear in Table I.

*Table I*

| | Sample | | | | |
|---|---|---|---|---|---|
| | 1 | 2 | 3 | 4 | 5 |
| Tetramethylthiuram monosulfide (p.p.m.) | 0 | 10 | 100 | 500 | 1,000 |
| Polymerization time | 22 min | 18 hr | 43 hr | 66 hr | 62 hr |

EXAMPLE 2

A 73% solution of acrylamide in water containing 1.3% ammonium sulfate is divided into 3 samples and inhibitors added as shown in Table II. The samples are then placed in sealed tubes and maintained at 55° C. while observing the time for polymerization to set in. Results appear in Table II.

*Table II*

|  | Sample | | |
| --- | --- | --- | --- |
|  | 1 | 2 | 3 |
| Tetramethylthiuram monosulfide (p.p.m.) |  | 1,000 |  |
| Tetraisopropylthiuram disulfide (p.p.m.) |  |  | 1,000 |
| Polymerization time (hr.) | 2.5 | 118 | 42 |

EXAMPLE 3

The procedure of Example 1 is repeated except that a 60% solution of methacrylamide is employed. Substantially similar stabilization results are obtained.

Extended stabilization is similarly obtained with the other inhibitors of this invention.

We claim:

1. A method of inhibiting the polymerization of an amide selected from the group consisting of acrylamide and lower α-alkyl acrylamides which comprises mixing therewith at least about 10 parts per million of tetramethylthiuram monosulfide.

2. An amide selected from the group consisting of acrylamide and lower α-alkyl acrylamides stabilized against polymerization containing as a polymerization inhibitor tetramethylthiuram monosulfide.

References Cited in the file of this patent
UNITED STATES PATENTS

| 2,662,876 | Antlflinger | Dec. 15, 1953 |
| 2,749,331 | Breslow | June 5, 1956 |

OTHER REFERENCES

Kluchesky et al.: Ind. and Eng. Chemistry, vol. 41, No. 8, p. 1768.

Ferington et al.: Journal of the American Chemical Society, vol. 77, p. 4510–4512 (1955).

Dunbrook: India Rubber World, vol. 117, pp. 486 and 552 (1948).

D'Alelio: Fundamental Principles of Polymerization (1952), John Wiley and Sons Inc., New York, p. 323.